US012434411B2

(12) United States Patent
Rau et al.

(10) Patent No.: US 12,434,411 B2
(45) Date of Patent: Oct. 7, 2025

(54) POTTING APPARATUS FOR A GAS EXCHANGER

(71) Applicant: Xenios AG, Heilbronn (DE)

(72) Inventors: Michael Rau, Bad Friedrichshall (DE); Lotte Schraven, Aachen (DE); Sven Filipon, Heilbronn (DE); Ralf Rossbroich, Munich (DE)

(73) Assignee: Xenios AG, Heilbronn (DE)

( * ) Notice: Subject to any disclaimer, the term of this patent is extended or adjusted under 35 U.S.C. 154(b) by 887 days.

(21) Appl. No.: 17/625,628

(22) PCT Filed: Jul. 8, 2020

(86) PCT No.: PCT/EP2020/069309
§ 371 (c)(1),
(2) Date: Jun. 8, 2022

(87) PCT Pub. No.: WO2021/005132
PCT Pub. Date: Jan. 14, 2021

(65) Prior Publication Data
US 2022/0332022 A1    Oct. 20, 2022

(30) Foreign Application Priority Data
Jul. 11, 2019  (DE) .......................... 102019004887.3

(51) Int. Cl.
*B29C 39/24* (2006.01)
*A61M 1/16* (2006.01)
(Continued)

(52) U.S. Cl.
CPC .............. *B29C 39/24* (2013.01); *B29C 39/08* (2013.01); *B29C 39/10* (2013.01); *B29C 39/32* (2013.01);
(Continued)

(58) Field of Classification Search
CPC ........... B29L 2031/753; B29L 2031/14; B29L 2031/755; B29C 39/08
See application file for complete search history.

(56) References Cited

U.S. PATENT DOCUMENTS 3,923,209 A    12/1975  Roy
5,265,761 A *  11/1993  Brown .................. B29B 7/7678
                                                222/145.2
(Continued)

FOREIGN PATENT DOCUMENTS

CA      2394388      6/2001
CN    101909726    12/2010
(Continued)

OTHER PUBLICATIONS

International Search Report and Written Opinion in International Appln. No. PCT/EP2020/069309, mailed Dec. 18, 2020, 22 pages.

*Primary Examiner* — Abbas Rashid
*Assistant Examiner* — Elisa H Vera
(74) *Attorney, Agent, or Firm* — Fish & Richardson P.C.

(57) ABSTRACT

The present disclosure relates to a casting device for producing a potting for a gas exchanger and a method for producing such a potting. Accordingly, a casting device is proposed for producing a potting for a gas exchanger under the influence of a centrifugal force, comprising a distributor comprising an opening and at least one continuous channel and adapted to receive a fluid potting material via the opening and to guide it via the at least one channel. The casting device further comprises a cassette defining an inner cavity for receiving gas exchanger elements and which is fluidly connected to the at least one channel. The distributor comprises at least two distributor components which, in the assembled state of the distributor, define the opening, are (Continued)

connected to one another in a leak-proof manner, and form the at least one channel between adjacent regions.

15 Claims, 9 Drawing Sheets

(51) Int. Cl.
*B01D 19/00* (2006.01)
*B01D 63/02* (2006.01)
*B29C 39/08* (2006.01)
*B29C 39/10* (2006.01)
*B29C 39/32* (2006.01)
*B29K 75/00* (2006.01)
*B29L 31/00* (2006.01)

(52) U.S. Cl.
CPC ....... *A61M 1/1698* (2013.01); *B01D 19/0031* (2013.01); *B01D 63/022* (2013.01); *B29K 2075/00* (2013.01); *B29L 2031/753* (2013.01)

(56) References Cited

U.S. PATENT DOCUMENTS

| | | |
|---|---|---|
| 10,286,137 B2 | 5/2019 | Maurer et al. |
| 2001/0000452 A1* | 4/2001 | Kochanowicz ........... D06P 5/08 366/173.1 |
| 2002/0047220 A1 | 4/2002 | Su |
| 2009/0238967 A1 | 9/2009 | Helff et al. |
| 2010/0276355 A1 | 11/2010 | Kashihara |
| 2014/0335386 A1 | 11/2014 | Ikeya et al. |
| 2015/0048531 A1 | 2/2015 | Annen et al. |
| 2015/0060464 A1 | 3/2015 | Mann et al. |
| 2016/0095969 A1 | 4/2016 | Maurer et al. |
| 2016/0339514 A1 | 11/2016 | Urhahn et al. |
| 2020/0177038 A1 | 6/2020 | Frohlich et al. |

FOREIGN PATENT DOCUMENTS

| | | |
|---|---|---|
| CN | 103028328 | 4/2013 |
| CN | 202985972 | 6/2013 |
| CN | 104321187 | 1/2015 |
| CN | 104427808 | 3/2015 |
| CN | 106029253 | 10/2016 |
| CN | 206106264 | 4/2017 |
| DE | 69607946 | 1/2001 |
| DE | 102006021066 | 11/2007 |
| DE | 102017214309 | 2/2019 |
| EP | 0138763 | 4/1985 |
| GB | 1590045 | 5/1981 |
| JP | S51-103083 | 9/1976 |
| JP | H11-10702 | 1/1999 |
| JP | 2009-131746 | 6/2009 |
| JP | 2015-218770 | 12/2015 |
| WO | WO 1996/027486 | 9/1996 |
| WO | WO 00/06357 | 2/2000 |
| WO | WO 2003/006134 | 1/2003 |
| WO | WO 2003/051495 | 6/2003 |

* cited by examiner

POTTING APPARATUS FOR A GAS EXCHANGER

CROSS-REFERENCE TO RELATED APPLICATIONS

The present application is the national stage entry of International Patent Application No. PCT/EP2020/069309, filed on Jul. 8, 2020, and claims priority to application Ser. No. 102019004887.3, filed in the Federal Republic Germany on Jul. 11, 2019, the disclosures of which are expressly incorporated herein in their entireties by reference thereto.

TECHNICAL FIELD

This disclosure pertains to a casting device for producing a potting for a gas exchanger and a method for producing such a potting.

BACKGROUND

In external lung systems, blood is collected from a patient via a patient access and is passed or fed through a gas exchange membrane to cause CO, depletion and oxygenation of the blood. External lung systems are used, e.g., if this gas exchange is not sufficiently supported by the physiological condition of the patient. In order to avoid pumping assistance, the blood may be taken from an arterial access, such that the patient's own circulation causes the blood to be collected and fed through the lung system. However, this requires that the resistance in the lung system or the gas exchange membrane is maintained as low as possible and that the lung system has relatively small dimensions.

Accordingly, lung systems may include a plurality of gas exchange membranes which are either stacked on top of each other or wound into each other, e.g., as membrane mats which contain a plurality of semi-permeable hollow fibers and which permit gas exchange but no liquid transfer. In this way, blood may be passed across the membrane from one connection side of the system and may then be returned to the patient via a connection that is arranged downstream, wherein oxygen passes through the hollow fibers of the membrane. Due to the high affinity of hemoglobin to oxygen, an oxygenation of the blood is obtained via the diffusion gradient while simultaneously the carbon dioxide dissolved in the blood is depleted.

The mat-shaped structure of the membrane furthermore maximizes the gas exchange surface. However, this also requires that the incoming and outgoing blood as well as the hollow fibers are sufficiently sealed to prevent contamination of the interior of the gas exchanger and to avoid putting the safety of the patient is at risk. This sealing is conventionally achieved by means of a potting or grouting, wherein the potting material is fed into a funnel and is distributed along the gas exchanger via the surrounding cassette in order to seal the peripheral surfaces of the gas exchanger under the influence of centrifugal forces.

However, the use of conventional funnels has the disadvantage that the distribution channels are clogged after use due to the hardened or cured potting material which cannot be removed. The funnels may therefore only be used as disposable items. This means that the production of the potting or potting compound is not only associated with a high waste load, but also with high costs, for example in the case of 3D printing of the disposable funnel. Tolerance fluctuations may also occur during the production of such funnels, such that the production of the potting may not be exactly reproducible.

Furthermore, the cleaning process of the cassettes is complex. Leaks may occur between the cassette and the gas exchanger elements contained therein, for example between the cassette and a closure or end cap, requiring increased reworking or post-processing and causing contamination of the clean space. These leaks are enhanced by the slow and uneven temperature equalization of the cassettes. This is all the more true since not only the process times are influenced by the long heating and cooling times, but also an increased shrinkage of the potting material may occur. For example, longer cooling times and the uneven cooling may lead to shrinkage and bubble formation in the potting material, which impair the structural properties and also the sealing of the gas exchanger elements. Any residues of the potting material together with process-related leaks may thus reduce the effect or purpose of the potting and potentially put the safety of the patient at risk.

In addition to the unfavorable thermal properties, the quality or structural stability is influenced by various factors, such as the amount of potting material and the casting time or the control, as well as tolerance fluctuations of the gas exchanger elements, which may vary individually depending on the selected elements. For example, strong fluctuations in the dimensions of the casting may exist, which result from material tolerances and the desired defined diameter. The distribution of the potting material is often not uniform, such that the casting device must be installed or mounted onto the centrifuge again several times. This further increases the already long process times due to the clasping process and the additional casting times. Accordingly, the potting is produced in several stages, resulting in weld seams that increase the risk of leaks.

It is therefore difficult to enable or ensure a production of a potting compound with a reproducible diameter.

Accordingly, the present disclosure describes the production of a potting for a gas exchanger in such a way that a higher structural integrity of the potting compound is provided using a simplified and shorter production process.

SUMMARY

Based on this technological background, the present disclosure enables an improved production of a potting for a gas exchanger.

Accordingly, a casting device for producing a potting for a gas exchanger under the influence of a centrifugal force is suggested. The casting device comprises a distributor which comprises an opening and at least one through or continuous channel and is adapted to receive a fluid potting material through the opening and to guide or pass it through the at least one channel. The casting device further comprises a cassette defining an inner cavity for receiving gas exchanger elements and which is fluidly connected to the at least one channel. The distributor comprises at least two distributor components, which in the assembled state of the distributor define the opening, are leak-proof connected to each other, and form the at least one channel between adjacent areas.

The distributor may, for example, be placed on top of the cassette and fastened to it, for example by means of screws or clamps, either using positive locking or by interference fitting. The distributor components may initially be assembled or plugged or inserted together, or they may be placed one after the other on the cassette to form the distributor on the cassette. Although the arrangement of the distributor components already causes their connection, they may still be connected to each other by means of a fixing device, for example by means of a clamping ring, which may be tightened or fastened stepwise or steplessly. This allows an improved sealing between the respective distributor components to be achieved.

An arrangement on the top side has the advantage that the potting material may be fed in or inputted from the above, for example via a nozzle which is inserted into the opening. This may be particularly advantageous for potting materials which cannot be easily distributed due to their material properties, such as viscosity or wetting properties, and may therefore flow into the channel—supported by gravity.

The channel also allows the potting material to flow from the opening to the inner cavity of the cassette, thus providing a fluid connection. The channel is formed between adjacent areas of the distributor components. In other words, a channel is formed by a corresponding design of the distributor components at an interface or boundary surface, for example a semicircular through-hole, and the corresponding arrangement of the distributor components where the interfaces touch each other. Thus, both boundary surfaces may be provided with a semicircular through-hole such that a circular channel is formed when the distributor is assembled.

Alternatively, a semi-circular through-hole may also be provided at only one boundary surface, such that the semicircular through-hole is limited by a straight surface when assembling the distributor and the channel hence extends accordingly semi-circularly or as a half cylinder. The corresponding interface may form at least one channel. Instead of a semicircular shape, other shapes such as a rectangular or ellipsoidal shape may be used.

The arrangement of the channel at the interface or between the distributor components facilitates the removal of the potting material by enabling that the channel may be opened and completely cleaned. While this is not possible in conventional funnels, which consist of one component or include an internal channel, or due to the strength after hardening of the potting material, the subdivision or division of the distributor and the arrangement of the channel allow for easy detachment of the potting compound or the potting material. Such a division may be achieved, for example, by loosening a clamping ring and fixing screws, after which the distributor components may then be pulled outwards and away from the cassette.

The casting device and the distributor components may thus be easily deformed or demolded, such that the components of the device may be easily removed and cleaned without leaving large residues of the potting material. The distributor components may therefore be formed without undercuts and, for example, have demolding chamfers or be partially rounded.

Thus, the distributor components are advantageously components, which may be connected with each other in a detachable manner such that assembling the distributor is reversible.

Optionally, the distributor components may also be provided with one or more recesses at the region to be connected to the cassette, for example two wedge-shaped recesses, such that the insertion of a corresponding wedge-shaped element and/or fork produces a press fit and/or a lever force. This facilitates the separation of the respective distributor component from the cassette, while the cured casting or potting material remains intact. This allows the channel, which forms an inlet for the inner cavity of the cassette, to be exposed and the separation from the cassette may hence take place at an earlier stage.

The channel or inlet can be fluidly connected to the inner cavity by means of a seal, such that no potting material may escape between the channel and the cassette. For example, the channel may be surrounded by the seal in the circumferential direction or circumferentially, such that the seal may be formed as a flat seal or O-ring. The cassette may also have a bore for each channel, which fluidly connects the channel with the inner cavity, such that the potting material may be distributed through the bore over a casting space or chamber.

Various gas exchanger elements may be provided in the inner cavity. For example, at opposite sections of the cassette, e.g., at an upper and lower side seen in the direction of the centrifugal axis, closures may be arranged with gas exchange membranes in the form of hollow fiber mats being arranged therebetween. The channel may be arranged in such a way that the introduction of the potting material provides potting or grouting at the sections of the gas exchanger to be sealed. For this purpose, the casting device may be mounted on a centrifuge, for example via a corresponding configuration of the lower section of the cassette.

During production, the potting material may then be introduced into the opening via a nozzle and brought into the inner cavity via the channel, wherein the amount of the potting material and the shape of the cassette may predefine the thickness or strength of the potting. By curing the potting material during centrifugation, a potting is produced which closes off the gas exchanger elements. Curing may already take place at ambient temperature. Optionally, however, an increase in the temperature to a preferred reaction temperature may be provided for curing the potting material in order to further optimize the potting pattern.

The potting material may be selected according to the desired properties of the potting, such that the gas exchanger, for example, may have a predefined strength and/or transparency. For example, the potting material may be polyurethane and be introduced into the opening as a synthetic resin. However, any material that is initially liquid at ambient temperature and suitable for mixing and only initiates curing after a predefined period of time may be selected as the potting material. For example, the potting material may alternatively include or consist of silicone.

In the assembled state of the distributor, the distributor parts can form at least two through or continuous channels. Thereby, different areas of the inner cavity may be filled simultaneously via the central opening, such that the distribution of the casting material may be optimized. This allows the channels to be arranged on opposite regions of the cassette extending in a radial direction to the centrifugal axis. The inner cavity and any potentially present bores drilled in the cassette or in the introducing region of the cavity may be shaped in such a way that the potting material that is fed through each channel encloses the gas exchanger elements in a semi-circular manner. This allows the gas exchanger elements to be completely enclosed by the potting material by allowing the potting material to form an outer shell of the gas exchanger.

The distributor components may also form more than two channels. For example, three channels may be formed, wherein a third channel is arranged between two channels that are arranged at opposite sections of the cassette to provide an intermediate space or gap of the gas exchanger with a potting and/or to provide further structural stability. Four channels may also be provided, wherein two channels are each arranged at the opposite portions or sections of the cassette and are spaced apart from each other so as to feed the potting material in different areas of the inner cavity, for example, by accordingly shaping the inner cavity and/or a present bore of the cassette.

The majority of the channels may also be formed by more than two distributor components. For example, three distributor components may be provided, which in the assembled state form a circular or cylindrical or rectangular distributor and define a channel at each of three boundary surfaces or interfaces. Accordingly, the number of channels and distributor components as well as the arrangement of the channels may be adapted to the details and properties of the gas exchanger to be formed.

In order to facilitate the assembly of the distributor and the arrangement or fixing of the distributor on the cassette, the distributor is can be formed of uniform or equally shaped distributor components. For example, the distributor may be substantially cylindrical, with each distributor component forming a corresponding section of the cylinder, such as a semicircle if two distributor components are provided, or a quarter-circle if four distributor components are provided. Accordingly, the distributor components may also form parts of a rectangle.

The distributor components can be formed symmetrically, such that the assembly does not require a particular alignment or orientation of the respective distributor component, but only requires that the boundary surfaces or interfaces adjoin each other. This significantly facilitates the production of the distributor components, since only one form or type of distributor component has to be produced in order to enable the intended form of the distributor.

Although it is generally possible to juxtapose the distributor components together, each distributor component in the assembled state of the distributor can be adjacent to two distributor components and forms a channel with the adjacent distributor component. Therefore, at least three distributor components are provided, e.g., four, wherein each distributor component defines at opposite interfaces or boundary surfaces a part of a channel which, in the assembled state of the distributor, forms a channel with the interface of the respective adjacent distributor component. Accordingly, the distributor may comprise a number of channels, for example, at least three channels, at least four channels, three to five channels, three channels, four channels, etc. For example, each distributor component forms a quarter circle or an angle, wherein the interfaces or boundary surfaces are provided at the end faces. In other words, the channels can be formed in the areas or regions where the distributor components are connected to each other to form the circle or rectangle.

Since gas exchangers usually require sealing from multiple sides, the distributor is can be formed of three or four uniform or uniformly shaped distributor components. This allows four channels to be provided, which are evenly spaced in a circumferential direction and are each provide a side of the gas exchanger to be formed or to be sealed with the potting material.

Accordingly, one half of a channel may be provided on each side of the distributor components, such that when the distributor components are assembled, a total of four complete channels are established, which enable uniform distribution of the potting material. Furthermore, the flow paths of the potting material are considerably shortened such that the sealing may be carried out more efficiently and effectively and the casting device therefore only has to be mounted once on the centrifuge or the manufacturing process may be carried out continuously and may thus shortened. This also avoids binder seams, thus reducing the risk of leakage of the gas exchanger.

Depending on the process conditions, the distributor components may be formed of a material that provides a leak-proof seal between the distributor components in the assembled state of the distributor, for example, when partially using an elastomer. Alternatively, further sealants or sealing means may be provided. As a result, each distributor component may include an inner seal and an outer seal on opposite sides of the respective channel, each of which fluidly seals the channel in the assembled state of the distributor.

Such a seal may, for example, be provided in the form of a cord or string, such that the distributor components are sealed to each other with two sealing cords each, thus preventing the sealing material from escaping into the surroundings while the centrifuge is running. The sealing cord may be inserted on one side of the distributor part or at an interface or boundary surface into a sealing groove provided at the interface or boundary surface, wherein the opposite interface or boundary surface of the respective other distributor component is smooth and thus provides an optimum sealing surface. The sealing cords can extend from the opening to the cassette or a bore in the cassette, wherein the cassette may also have a seal or gasket in the form of a flat gasket at this area, as described above. This ensures that the potting material introduced into the opening may flow via the channel into the inner cavity of the cassette without escaping from the casting device due to centrifugal forces.

To introduce or feed the potting material, a nozzle or other filling device may be provided, which is arranged in the opening. In order to facilitate the introduction and to allow the introduction via the opening to be essentially independent of the specific configuration of the filling device, the opening preferably defines a funnel-shaped filling area for the potting material. Thereby, different flow velocities of the potting material—without adaptation of the distributor—and different potting materials may be selected for the production of the potting or grouting. The funnel shape provides a larger surface in relation to the opening of the filling device, such that any rebounding casting material is intercepted and fed into the respective channel. In other words, the funnel shape of the opening is to be understood as providing a funnel-shaped opening area upstream of the respective channel.

Due to possible deviations of the process conditions, the required quantity or amount of the potting material may vary. In order to avoid precise measurement of the potting material and to compensate for these deviations, the distributor components can furthermore define an overflow in the assembled state of the distributor, which is arranged and shaped in such a way that a flow of material over a predetermined boundary surface or interface in the inner cavity causes a flow of material into the overflow.

The overflow may be adapted to the opening or the filling area or, together with this area, may establish a guiding structure for the excess potting material. For example, the overflow may be shaped and arranged such that the excess potting material flows into the overflow and is collected there, when the potting material in the inner cavity of the cassette is filled to such an extent that the material, in a radial direction, reaches the edge of the filling area extending towards the opening.

The overflow and the filling area therefore have a diameter that is precisely adapted to the inner cavity and/or the gas exchanger contained therein, such that the introduction of the potting material does not have to be controlled either by quantity or by time, and deviations in time, potting material, and dimensions of the gas exchanger elements may be eliminated.

The overflow also allows the manufacturing process to continue continuously without interruption, such that binder seams may be avoided and process times may be shortened.

In order to avoid temperature fluctuations as far as possible and to enable improved thermal distribution within the cassette, the opening can extend to an outer surface of the cassette and connect said surface fluidly with the surroundings. The opening can be concentric with a centrifugal axis of the casting device.

In conventional casting devices, the cassette is often enclosed on an upper side by a distributor or funnel and is at least partially coupled to a centrifuge element on a bottom side. This may result in temperature variations, which may not only require an extended cooling time, but may also result in an uneven cooling. As a result, shrinkage and blistering may occur, thereby increasing the risk of leakage.

However, by extending the opening to the outer surface of the cassette, a thermal exchange between the cassette and the environment is possible, such that the ambient temperature provides ventilation and may support the production of the potting. The concentric arrangement also has the advantage of achieving a larger central surface or area and an improved thermal dissipation.

Therefore, a production with relatively short heating and cooling times and/or with short process times may be achieved. Due to the shortened cooling times, shrinkage may be considerably reduced. Furthermore, this may also be actively controlled by the ambient temperature, for example by a targeted control of the ambient temperature. For example, an ambient temperature between about 40° C. and 70° C. may be advantageous for gas exchanger fibers or a gas exchange membrane. This prevents visible shrinkage effects at the interfaces and damage to the hollow fibers. Furthermore, such an improved temperature distribution and temperature control may reduce the formation of bubbles, especially for round castings.

The optimized cooling also enables the manufacturing process to be carried out continuously without interruption, thus avoiding binder seams, shortening process times and improving the structural stability or integrity of the potting.

The advantageous temperature distribution may be further optimized by the material of the cassette. By accelerating cooling and making direct contact with the ambient air, the cassette may be made of various materials, which further reduce bubble formation through thermal properties. For example, the cassette may be made of aluminum, steel, aluminum alloy, steel alloy or similar material with high thermal conductivity and low thermal expansion coefficient.

In order to further reduce the manufacturing costs and also the waste caused by production, at least the distributor can be reusable. As the distributor components may be separated from each other and cleaned after a casting process has been completed, i.e., the remaining and potentially hardened potting material may be detached and removed from the respective channels, the cassette may be refilled after the distributor components have been reassembled. For this purpose, the distributor may be formed of a robust or durable material having sufficient structural strength such that the distributor may be used for a plurality of manufacturing operations.

The opening and at least one channel may furthermore be provided with a non-stick coating. This allows the potting material to be easily removed from the respective channel without leaving large residues. Furthermore, the distributor components may also be more easily separated from the cassette such that the integrity of the potting produced in the inner cavity of the cassette is not impaired. For example, the non-stick coating may be adapted not only to the material of the distributor, but also to the potting material used, such as polyurethane. The non-stick coating ensures that the distributor may be reused even more frequently.

In addition to the non-stick coating, the demolding or dismantling of the casting device may be facilitated by rounding and chamfering, without undercuts.

The distributor components may be made of a material comprising aluminum. In other words, the material may include aluminum, for example in an alloy, or the material may consist of aluminum. Aluminum has the advantage that the distributor components are relatively easy to handle while being robust, wherein a deformability of the material at the same time facilitates disassembly and cleaning. Furthermore, the production from aluminum enables the distributor components to be formed to fit exactly. This also makes it possible to manufacture the distributor parts using 3D printing.

Aluminum also has the advantage that this material has a low thermal expansion coefficient, such that the distributor components are dimensionally stable. Furthermore, aluminum may be used to dissipate or transfer heat well, which further optimizes the production of the potting compound. The aluminum provides optimized temperature compensation, such that the manufacturing process may be carried out continuously without interruption, binder seams may be avoided, process times may be shortened and the structural stability or integrity of the potting may be improved.

In an embodiment, the casting device further comprises a molded or pre-shaped seal or gasket, wherein the cassette is closable and adapted to receive the molded seal, and wherein the molded seal completely encloses the inner space and fluidly or fluid-tightly seals said space up to the at least one channel.

The cassette may then be opened such that the molded seal may be inserted into or may enclose the inner cavity of the cassette. In other words, the inner cavity and the gas exchanger elements arranged therein are positioned in the molded seal, with the outer surface of the molded seal matching the inside of the cassette. For example, the molded seal may have the desired inner shape of the potting and the external shape of the interior of the cassette, wherein the molded seal provides complete separation of the potting from the cassette.

For example, the molded seal for each channel or a respective bore in the cassette may include a sealing lip that is clamped or wedged by the cassette when the cassette is closed, ensuring a complete seal of the inner cavity. This prevents any potential leaks between the cassette and the gas exchanger elements during production of the potting compound. This does not require any reworking or post-processing of the casted gas exchanger, such that potential contamination of the clean space may also be avoided.

This also makes it possible to clean the cassettes with little effort, while the material of the molded seal allows easy removal from the potting material after the potting material has cured and the cassette has been opened. For example, the molded seal may be made of TM6MED. This means that the cassette may be separated from the potted gas exchanger elements at an early stage, further reducing production time.

The molded seal can be formed of two symmetrically shaped and couplable molded seal components. This enables a simple arrangement and simplifies the manufacturing of the molded seals. For example, the molded seal may be formed from an upper and a lower molded seal component, wherein the upper molded seal component provides a fluidic connection to the channel, for example by piercing a corresponding bore connection. The gas exchanger elements may be placed on the lower molded seal component, and the upper molded seal component may then simply be placed on top to close the molded seal.

In order to achieve even better temperature distribution and cooling and to reduce the complexity of the cassette and the molded seal, these may at least partially have non-continuous surfaces. Thus, it may be provided that the cassette is formed, in the direction of a centrifugal axis of the casting device, of an upper and lower couplable cassette component, wherein the cassette components are adapted to receive a respective molded seal component, and wherein the cassette components and the molded seal component each comprise a recess or opening for receiving a gas exchanger closure which is concentric with the centrifugal axis of the casting device.

This allows easy assembly, wherein the first molded seal component is inserted into the lower cassette component and the gas exchanger closure and gas exchanger elements are inserted onto the first molded seal component. Then an opposing gas exchanger closure and the second molded seal component may be placed on the first molded seal component and the upper cassette component may be placed on the second molded seal component. This allows the molded seal to completely enclose the inner space and seal it to the cassette in a fluid-tight manner. Due to the symmetrical design of the molded seal components, there are no problems with the assembly. The arrangement of the gas exchanger closures in corresponding recesses reduces the complexity of the molded seal and cassette. Furthermore, an arrangement of the gas exchanger elements is at least partially predefined, such that the insertion of these elements is supported.

Also, the accommodation in the recesses or openings allows for improved cooling, which may be necessary due to a different material to achieve homogeneous temperature distribution and cooling without bubble formation.

The cassette may also be equipped with a centering device to facilitate the assembly, such as centering sleeves, which simplifies the arrangement and insertion of cassette components and restricts or prevents relative movement. Furthermore, the cassette components may optionally be coupled together by means of a hinge and/or fixing screws may be provided in order to fasten the cassette components to one another and to clamp or wedge the molded seal sufficiently such that it is fluid-tight.

The lower cassette component may furthermore be configured for stable mounting on a centrifuge, while the upper cassette component closes the casting space or chamber and can be thermally coupled with the opening.

The recesses allow a simplified separation of the cassette from the mold seal as well as a simplified separation of the potted gas exchanger from the molded seal, e.g., since the gas exchanger may be pressed out of the molded seal via the closure.

Furthermore, a method of producing a potting for a gas exchanger under the influence of a centrifugal force is disclosed, the method including:
   providing a cassette and inserting gas exchanger elements into an inner cavity of the cassette;
   providing a distributor having at least one continuous channel and mounting the distributor on the cassette such that an opening of the distributor is fluidly connected via the channel with the cavity to form a casting device for producing a potting for a gas exchanger; and
   introducing a potting material into the opening under the influence of a centrifugal force,
wherein the attaching or mounting of the distributor comprises the assembling of distributor components to define the opening of the distributor and to form the channel between adjacent regions of the distributor components.

During assembly, the distributor components may be mounted one after the other on the cassette and secured with screws, for example. Furthermore, a seal between the distributor components may require a clamping ring to be placed around the distributor components and lightly tightened to clamp or compress the boundary surfaces or interfaces of the distributor components. A flat seal may also be provided between the at least one channel and the cassette, which provides sufficient sealing between the cassette and the distributor when attaching the distributor. Such a flat seal or gasket may be, e.g., an O-ring that is inserted in or on a groove of a bore.

To produce the potting, the casting device is mounted onto the centrifuge, which rotates around the central axis of the casting device. While the centrifuge is running, liquid potting material is introduced or fed in via the opening. For the filling of the material, for example, one or more nozzles may be provided which inject the potting material selectively into the opening, for example into a funnel-shaped filling area of the opening. Under the influence of centrifugal force, the potting material is then distributed over at least one channel such that the potting material may enter the inner cavity via optional bores in the cassette.

The liquid potting material may furthermore be tempered such that curing of the material may proceed optimally. For example, the casting device or individual sections of the casting device may be actively heated or cooled such that curing or polymerization occur homogeneously. For example, polyurethane may be used as a casting material and bubble formation may be avoided by temperature control. This reduces the risk of leakage in the gas exchanger.

After the casting material has cured or hardened, it cannot be pulled out of the respective channels of the funnel due to its strength or stiffness. However, by dividing or separating the distributor components and an optional non-stick coating in the distributor, the potting material may become detached such that the material may be removed from the respective channels and the channels or partial channels may each be cleaned. To facilitate separation from the cassette, the distributor components may furthermore have one or more recesses, such as two wedge-shaped recesses, in the area or region connected to the cassette. The insertion of a corresponding wedge-shaped element and/or fork may then produce a press fit and/or leverage which facilitates separation of the respective distributor components from the cassette while leaving the cured potting material behind.

In some embodiments, assembling the distributor components includes attaching an inner seal and an outer seal on opposite sides of the respective channel to each distributor component to fluidly seal the respective channel in the assembled state of the distributor.

Thus, each boundary surface or interface of the distributor components may be provided with a seal, wherein a sealing cord on one side of the distributor component or on one boundary surface or interface may be inserted or placed into a sealing groove provided on the boundary surface or interface, and wherein the opposite boundary surface of the respective other distributor component is smooth and thus provides an optimum sealing surface. The sealing cords can extend from the opening to the cassette or a bore in the cassette, wherein the cassette may also have a seal or gasket in the form of a flat seal at this position, as described in the above. This ensures that the potting material introduced into the opening may flow via the channel into the inner cavity of the cassette without escaping from the casting device due to centrifugal forces.

Furthermore, the provision of the cassette may include one or more of the following:
  providing a molded seal which is formed from two couplable molded seal components, wherein the cassette is closable and formed to receive the molded seal and wherein the cassette is formed from an upper and lower couplable cassette component, in the direction of a centrifugal axis of the casting device;
  inserting a first molded seal component into the lower cassette component and inserting or placing the gas exchanger elements into the first molded seal component;
  placing the second molded seal component on the first molded seal component; and
  placing the upper cassette component on the second molded seal component such that the molded seal completely encloses the inner space and fluidly or fluid-tightly seals said space up to the at least one channel.

A centering device may be used to simplify handling during assembly, for example centering sleeves which are inserted into the lower cassette component and onto which the upper cassette component is inserted or plugged. The cassette may then be closed or fixed with screws.

The molded seal components may be formed substantially identical, wherein an upper molded seal component comprises a sealing lip at the casting point or in the region of the respective channel or optional bore, which is previously pierced or punched out to permit a fluid connection between the respective channel and the inner cavity. This provides a sealed separation to the cassette. Thereby, the cassette may be easily removed or separated from the molded seal and the molded seal from the encapsulated or potted gas exchanger after curing.

Although the process may in principle be carried out with any casting device corresponding to the process described herein, the casting device used in the process can be a casting device as described herein, e.g., as described in the above.

BRIEF DESCRIPTION OF THE DRAWINGS

Embodiments of the invention are explained in more detail in the following description of the figures, in which.

DETAILED DESCRIPTION

Figure 1:
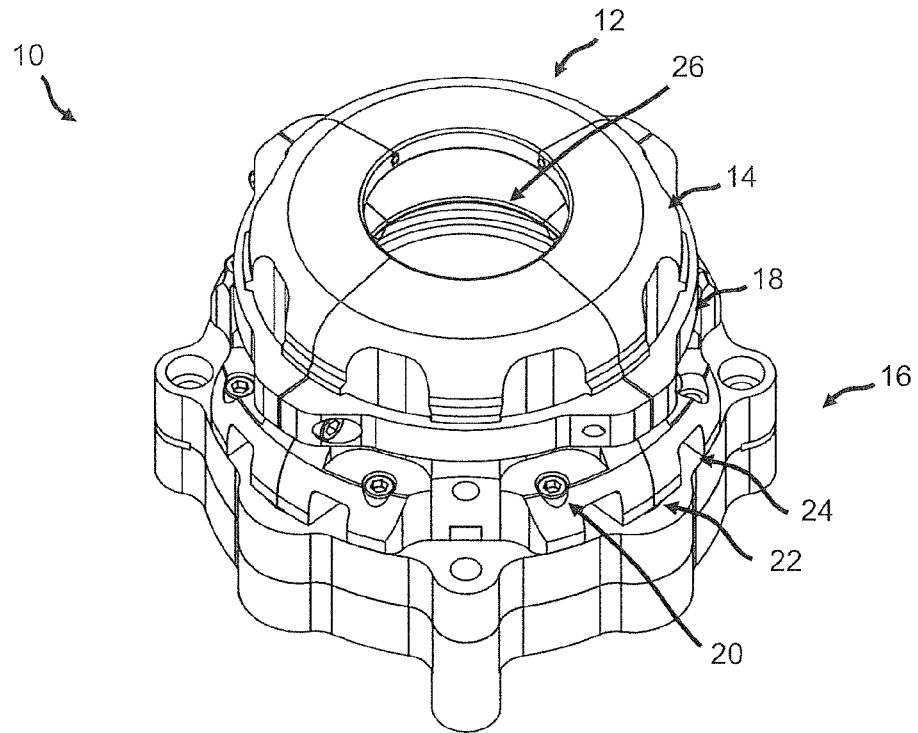
FIG. 1 is a perspective view of a casting device in an assembled state.

In the following, embodiments will be explained in more detail with reference to the accompanying figures. In the Figures, corresponding, similar, or like elements are denoted by identical reference numerals and repeated description thereof may be omitted in order to avoid redundancies.

The individual components of the casting device are described in view of the Figures, wherein the respective components are not shown in all Figures to provide a better overview and wherein optional components may be present in the embodiments.

FIG. 1 shows a casting device 10 in an assembled state in a perspective representation. The casting device 10 comprises a distributor 12 which is adapted to receive a potting material through an opening 26 and to distribute it through one or more channels inside the casting device 10 to a cassette, such that the potting material may form a potting for gas exchanger elements (not shown) contained in the cassette 16.

The distributor 12 is formed of multiple distributor components 14. According to the present embodiment, four distributor components 14 are provided, which together form a cylindrical distributor 12 and define the opening 26. However, an alternative number of distributor components 14 may be provided, such as two or three. The outer shape of the distributor 12 is not limited to a cylindrical shape, but may also be ellipsoidal or essentially rectangular, for example.

The distributor components 14 are connected to each other by means of a clamping ring 18 so that they are sealed at corresponding boundary surfaces or interfaces 22. As will be further explained below, in this embodiment channels are formed by the boundary surfaces or interfaces 22, which guide or feed the potting material that is received through the opening 26 to the cassette 16. In this embodiment, four channels are correspondingly provided, which are arranged circumferentially and at spacing to each other such that the gas exchanger elements contained in the cassette 16 are surrounded on four sides by the potting material.

Fixing screws 20, which provide a detachable connection, are also provided for fixing the distributor 12 or the distributor components 14 to the cassette 16. Accordingly, the distributor components 14 may be sequentially screwed onto cassette 16 and, after a manufacturing process, may be unscrewed again and separated from cassette 16.

To facilitate the separation of the distributor components 14, recesses 24 are provided which may be engaged with a separating device, such as a wedge-shaped separator, to remove the distributor components 14 from the cassette 16.

Figure 2:
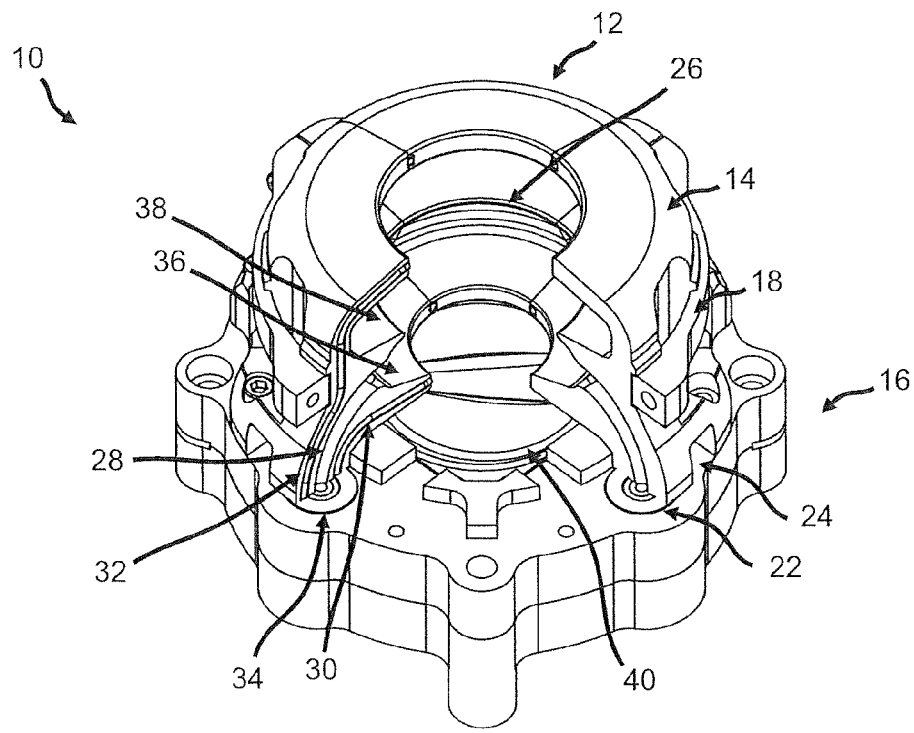
FIG. 2 is a perspective view of the casting device according to FIG. 1 with a missing distributor component.

FIG. 2 shows the casting device 10 with a missing (not shown) distributor component 14, wherein the boundary surfaces or interfaces 22 and the interior of the distributor 12 are exposed. Accordingly, a part of channel 28 is shown which, in the assembled state of the distributor, forms channel 28 with a corresponding part of channel 28 of an adjacent interface or boundary surface 22 of the respective other distributor component 14. In other words, each interface or boundary surface 22 may define half a channel, which is arranged such that when the distributor is assembled, a channel 28 is formed by adjacent interfaces or boundary surfaces 22 of two distributor components 14.

Channel 28 is also surrounded by a seal to prevent the potting material from escaping to the outside during production due to the centrifugal forces acting on it. The seal is provided by an inner seal 30 and an outer seal 32 which are located on opposite sides of channel 28. Seals 30, 32 extend from opening 26 to the end of channel 28 or to a bore in the cassette (not shown). A flat gasket 34 is also provided at this end, which is inserted in the bore and surrounds the channel. The channel 28 is thus fluidly or fluid-tightly sealed.

The potting material may reach the gas exchanger elements without loss or impairment of production. In order to simplify the filling, the opening 26 upstream of the respective channels 28 is funnel-shaped, such that a filling region 36 is defined. Due to the funnel shape, which may be formed continuously all around, it is also ensured that the potting material may be guided into the channel 28 during rebound.

Furthermore, an overflow 38 is provided above the filling region 36, which is adapted to the geometry of the filling region 36 and the inner space of the cassette 16. Due to the funnel shape of the filling region 36 and its arrangement, the overflow 38 may cause excess potting material to be guided so that the excess potting material runs into the overflow 38 and is collected there, when the potting material has been filled into the inner cavity of the cassette 16 to such an extent that it has reached the edge of the filling region 36 facing the opening 26 in the radial direction. In other words, the filling region 36 and the overflow 38 are shaped in such a way that they include a larger radial distance from the center of the cassette 16 than the inner tolerance range of the potting to be produced.

The opening 26 extends to the outer surface of the cassette 16 or to the top of the cassette 16 and enables, e.g., a cooling from the top of the cassette 16 due to the interaction with its surroundings. This allows the cassette 16 to be evenly tempered so that bubble formation due to irregular or uneven cooling is prevented. The opening may also provide a direct cooling of the gas exchanger elements, as shown by the exemplary closure 40, which is accommodated in a recess in cassette 16.

Figure 3:
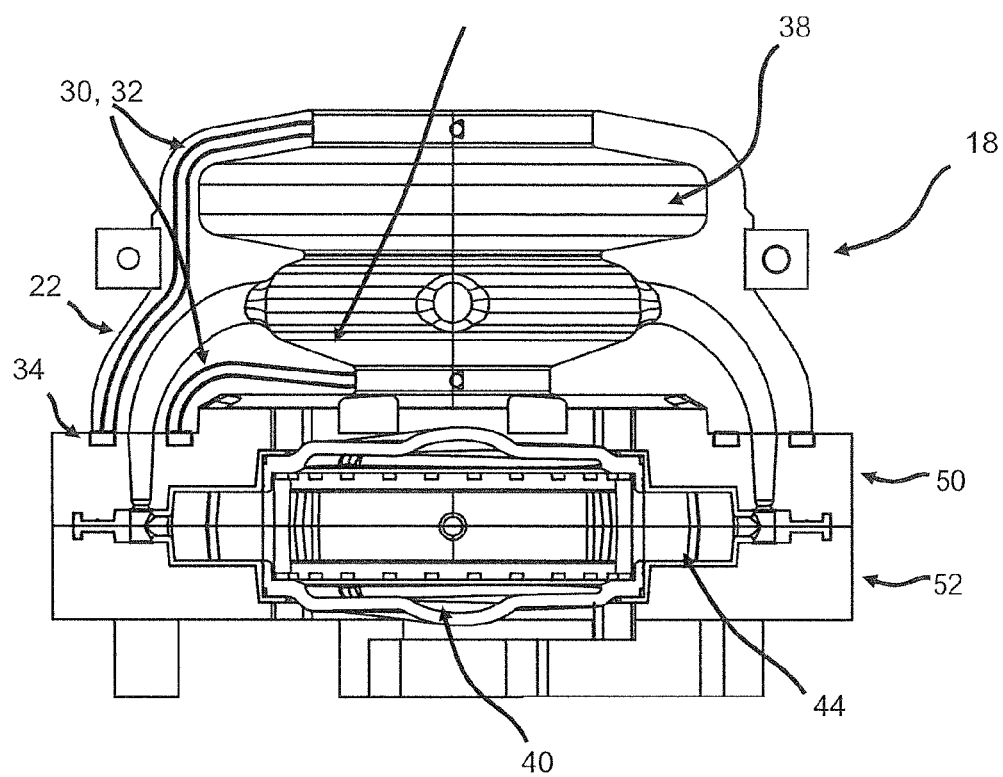
FIG. 3 is a sectional view of the casting device as shown in FIG. 1.

In the sectional view of the casting device 10 in FIG. 3, the inside of cassette 16 is shown. The cassette 16 comprises two cassette components 50, 52, namely an upper cassette component 50 and a lower cassette component 52, which are interconnected and are formed to be closable. The cassette components 50, 52 may thus be separated from each other or be opened to receive a molded seal 44, which covers the inner space of cassette 16 and is accordingly clamped or sandwiched to allow fluid sealing of an inner cavity to the cassette 16.

Figure 4:
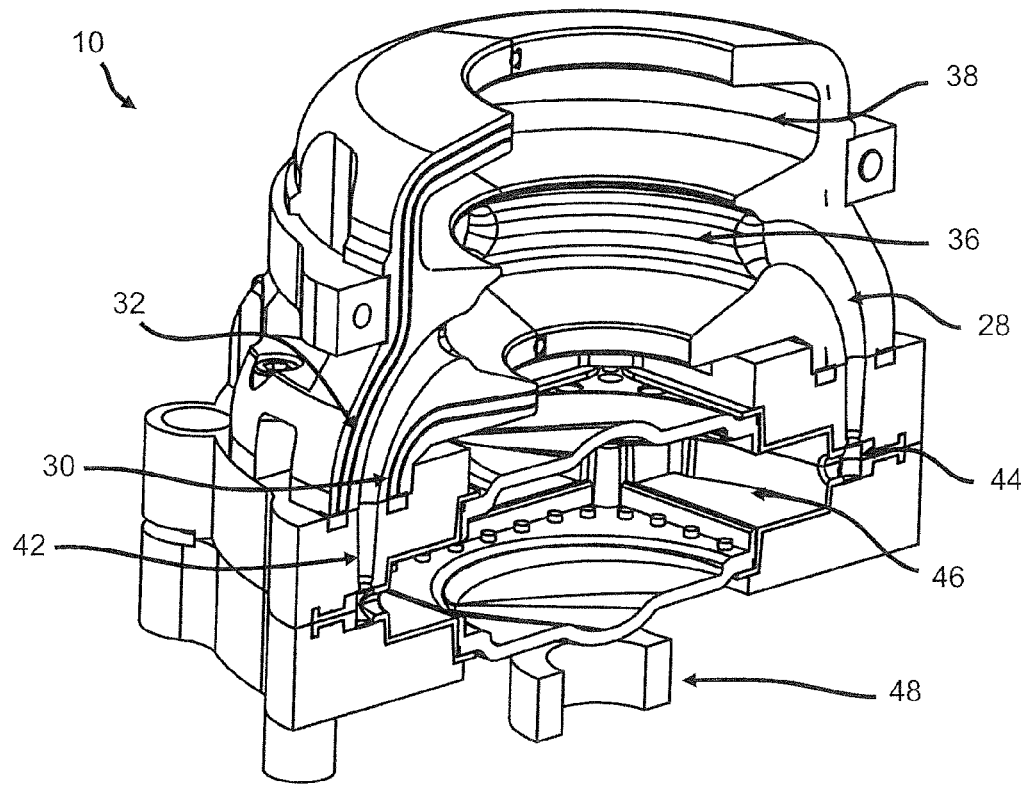
FIG. 4 is a perspective sectional view of the casting device according to FIG. 3.

This structure is shown further in FIG. 4. The inner cavity 46 of the molded seal 44 is shown. The inner cavity 46 is fluidly connected to the channels 28 via respective bores 42 of the cassette. However, it is prevented that potting material from the channels 28 penetrates into the cassette or into the interior of the cassette, for example, by sealing lips of the molded seal 44, which are arranged in the area of the bores 42. The sealing lips (not shown) are clamped by the assembly of the cassette and form a seal to the bore 42. Thus, potting material from the respective channel 28 passes through the bore 42 only into the inner cavity 46 of the molded seal 44. The gas exchanger elements, in the present embodiment in the form of two oppositely arranged closures of the gas exchanger, are also arranged in the molded seal 44 and are surrounded by the potting material up to the inner diameter of the filling region 36. This prevents the potting material from coming into contact with the cassette, which makes cleaning and separating the cassette components significantly easier. The cassette also includes a centrifuge attachment 48 at a bottom region, which facilitates mounting in a centrifuge and enables stationary fixation.

Figure 5:
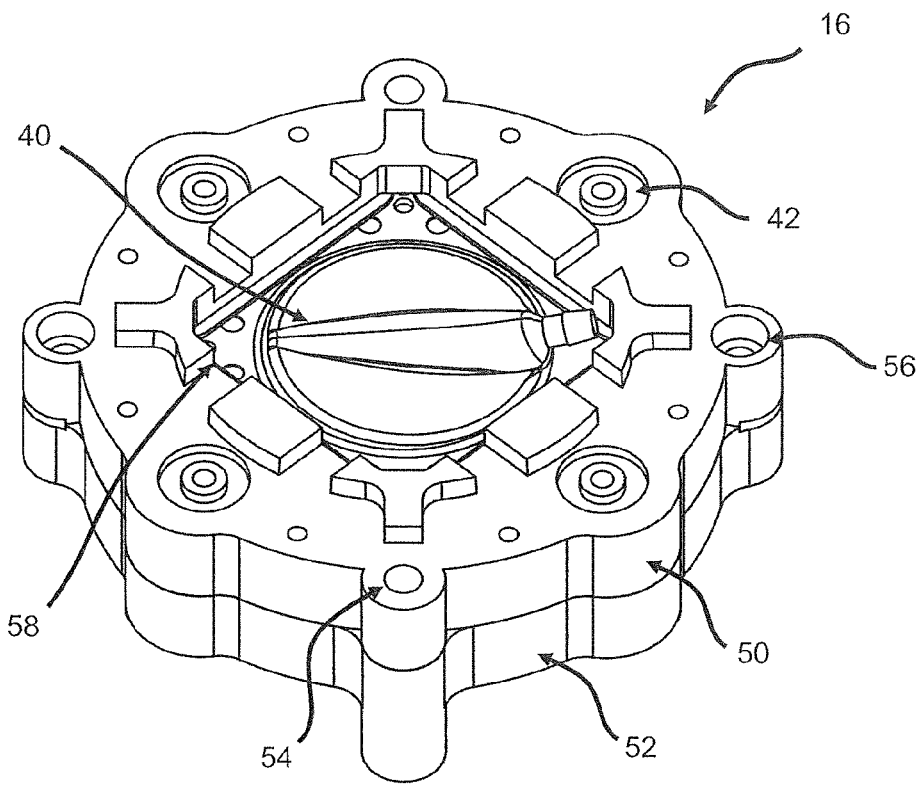
FIG. 5 is a perspective view of a cassette with a molded seal and a recess.
Figure 6:
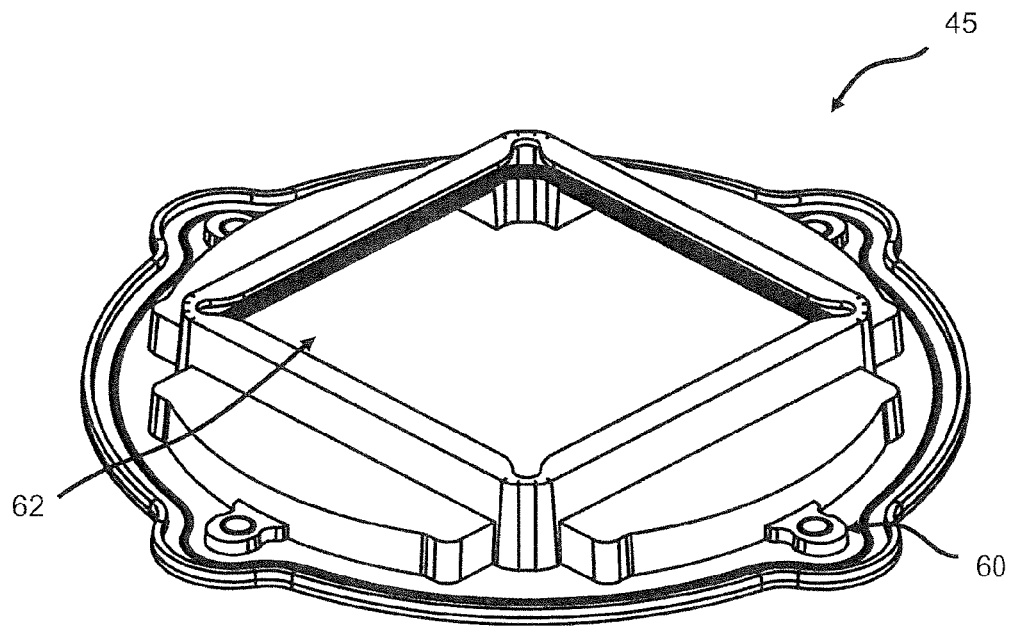
FIG. 6 is a top perspective view of a molded seal component for a cassette with a recess.

The cassette 16 is shown in detail in the perspective representation according to FIG. 5, wherein the cassette 16 is shown with a form seal and an opening 58 in the upper cassette component 50. Opening 58 allows a gas exchanger element or closure 40 to protrude from the cassette and be ventilated through the distributor opening.

In addition to the opening 58, the upper cassette component 50 includes a centering device 54 in addition to the bores 42, into which, for example, centering sleeves may be inserted, such that the upper cassette component 50 may simply be attached to the lower cassette component 52 and aligned accordingly. Furthermore, two fixing devices 56 are provided, by means of which the cassette components 50, 52 may be connected to each other, for example via corresponding screws.

Molded seal 44 can be formed from two symmetrical molded seal components 45, as shown in FIGS. 6 to 9. Accordingly, the molded seal component 45 has an opening 62 analogous to the cassette, in which, for example, a closure for the gas exchanger may be accommodated. This reduces the complexity of the molded seal component 45. Furthermore, this enables a simplified separation of the molded seal component 45 from the encapsulated gas exchanger elements after curing of the potting material. For example, a gas exchanger may be pressed out of the molded seal component 45 via the protruding closure.

The molded seal component 45 further comprises a number of sealing lips or sprue points 60 corresponding to the number of channels, wherein the sprue or gate points 60 are arranged to overlap with a bore of the cassette and the outlet of the respective channel to provide a fluidic seal to the cassette. Since the molded seal components 45 are symmetrically formed and a fluidic connection for the corresponding lower molded seal component 45 is not provided, the sprue points 60 may initially remain closed and, prior to insertion of the upper molded seal component 45, be pierced, punctured or perforated to provide the fluidic connection between the channels and the inner cavity.

Figure 7:
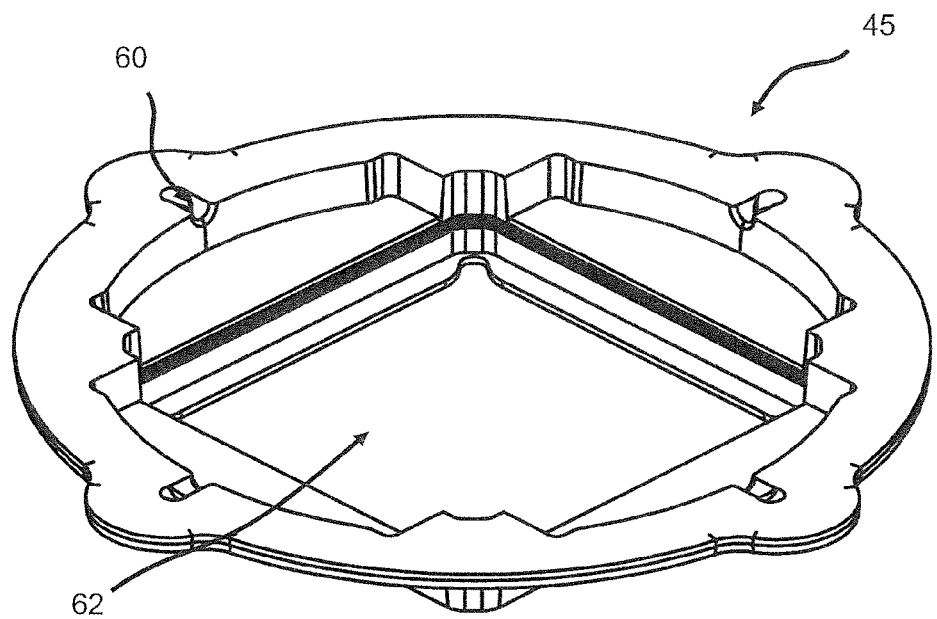
FIG. 7 is a bottom perspective view of the molded seal component according to FIG. 6.

Accordingly, FIG. 7 shows a lower molded seal component 45, wherein the sprue points 60 are not cut out, but wherein a short inlet to the inner cavity is also present.

Figure 8:
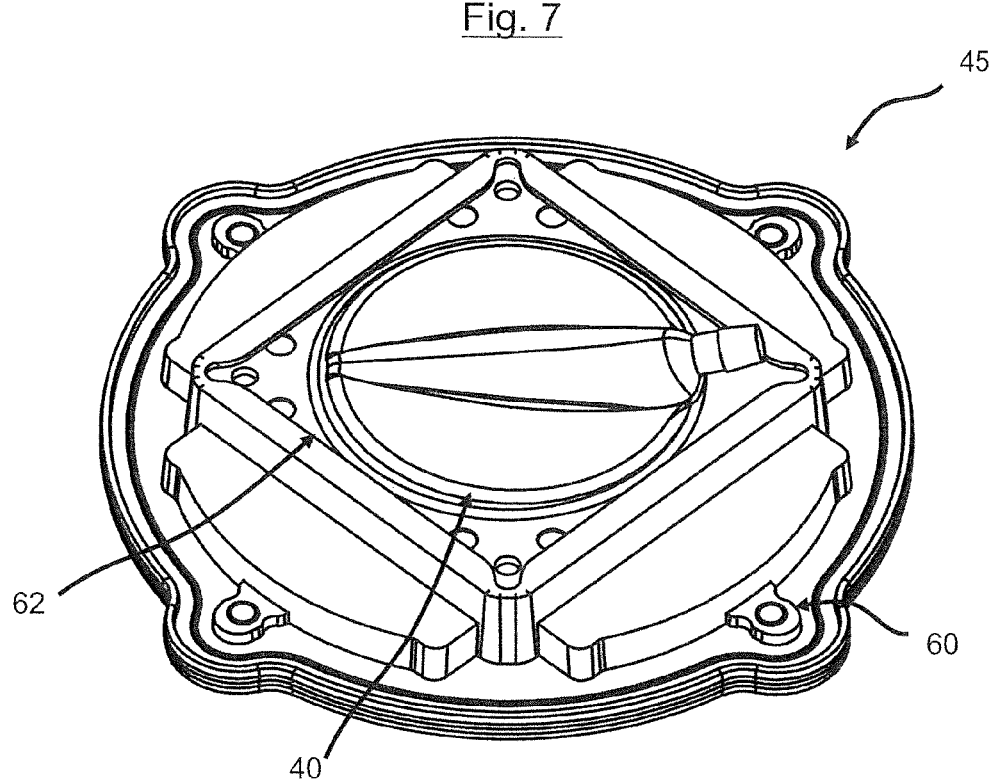
FIG. 8 is top perspective view of the molded seal component according to FIG. 6 with an inserted gas exchanger closure.
Figure 9:
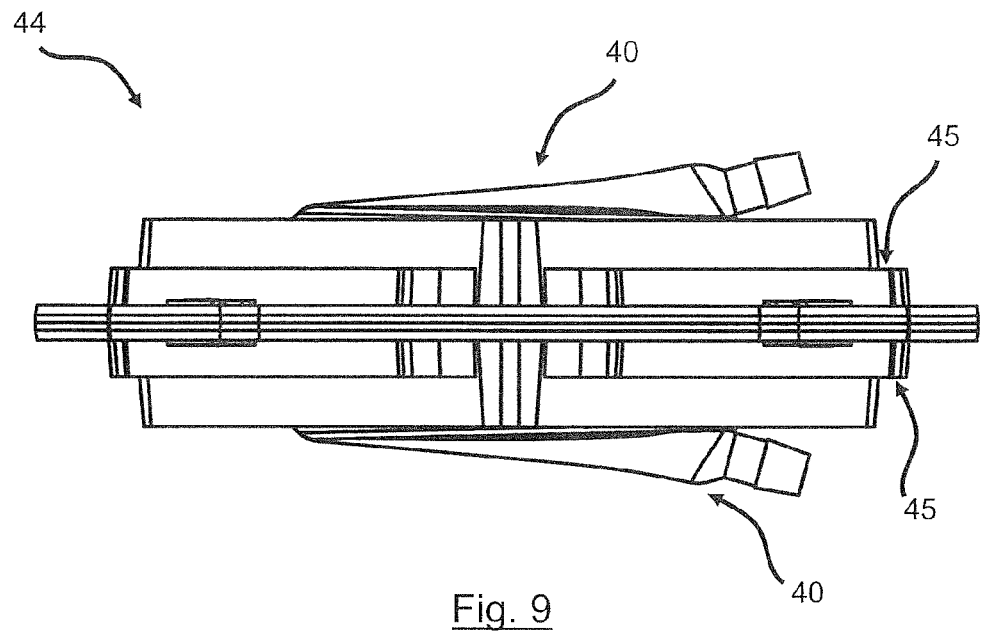
FIG. 9 is a side view of a molded seal with inserted gas exchanger closures.

FIG. 8 also shows the upper molded seal component 45 with a closure 40 inserted in the opening 62, wherein the sprue points 60 have not yet been cut out. The lower molded seal component 45 may be provided with a closure 40, wherein the molded seal components 45, when assembled, together form the molded seal 44, as shown in FIG. 9 in a side view.

Figure 10:
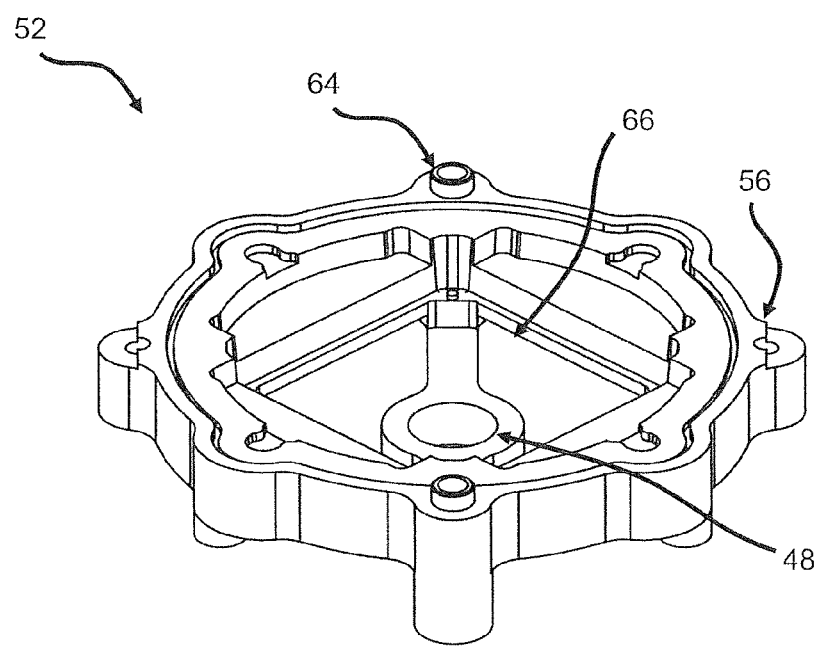
FIG. 10 is a perspective view of a lower cassette component for the cassette.

The lower molded seal component 45 may be received by a lower cassette component 52 by an appropriate configuration, as shown in FIG. 10 in a perspective view. In this embodiment, the lower cassette component 52 comprises a centrifuge attachment 48 in addition to the fixing device 56, which facilitates the mounting of the casting device in a centrifuge and enables stationary fixing. The centering device is also equipped with centering sleeves 64, which allow the upper cassette component to be attached to the lower cassette component 52 while simultaneously allowing an alignment as required.

Figure 11:
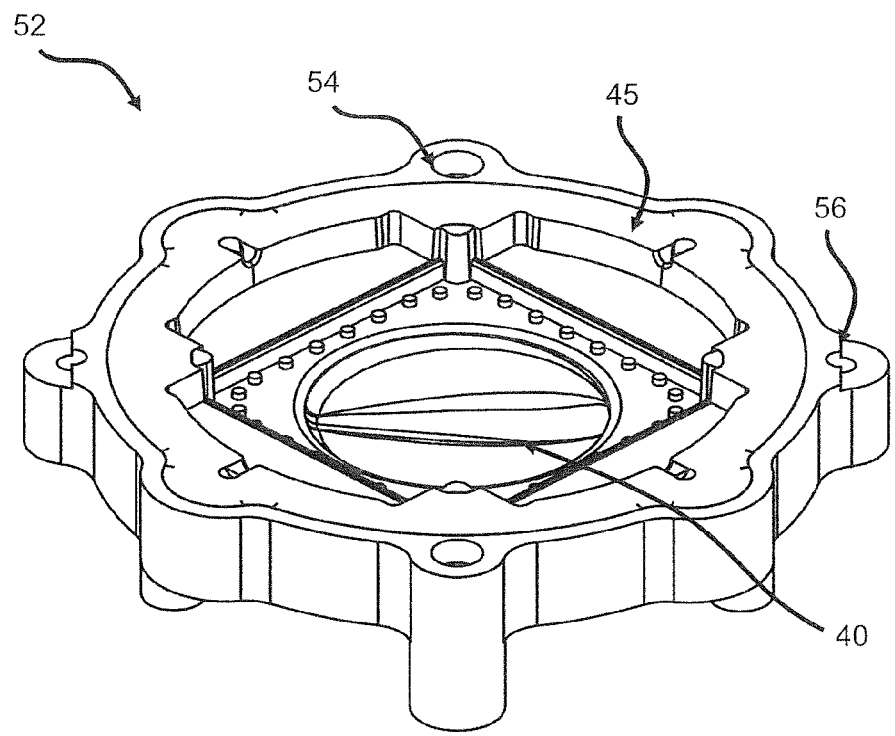
FIG. 11 is a perspective view of the lower cassette component according to FIG. 10 with inserted molded seal component and gas exchanger closure.

The lower cassette component 52, like the upper cassette component, has an opening 66 to accommodate a closure. This also allows ventilation on the bottom side of the cassette of the gas exchanger to be potted, such that an improved temperature distribution is achieved. This is shown in FIG. 11. A molded seal component 45 is inserted in the lower cassette component 52 and a closure 40 is received by the opening of the molded seal component 45. Centering sleeves have not yet been inserted in the centering device 54 in this Figure. As shown in this Figure, a fluid connection is not possible on the bottom side are there are no sprue points or bores.

Figure 12:
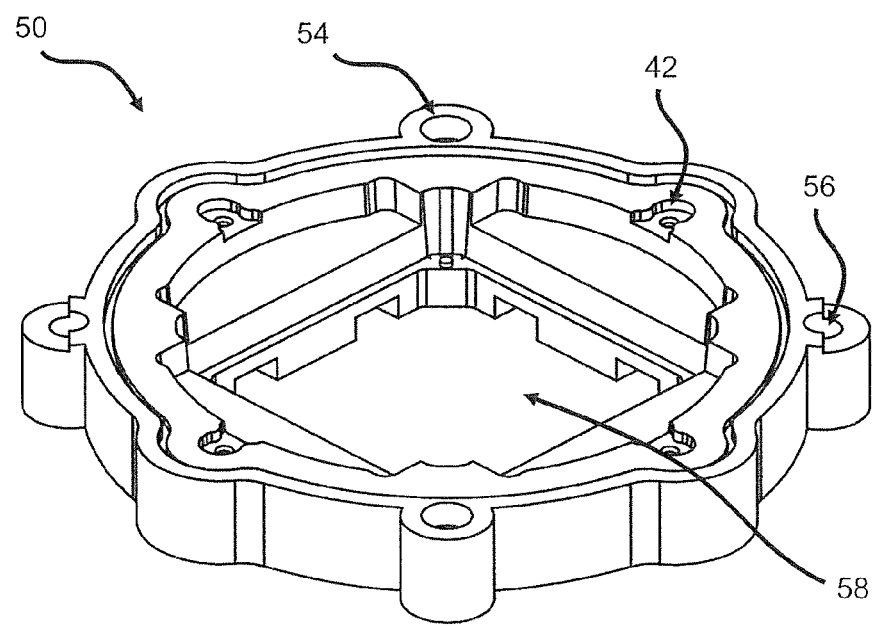
FIG. 12 is a perspective view of an upper cassette component for the cassette according to the invention.
Figure 13:
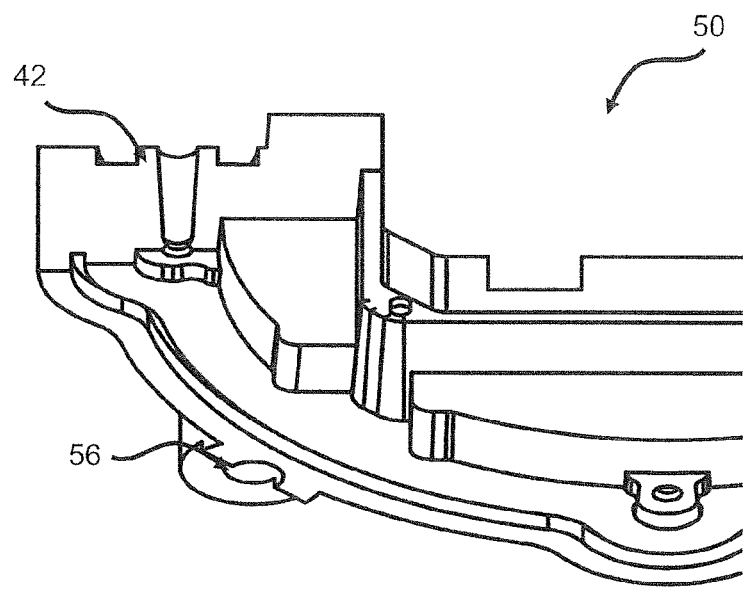
FIG. 13 is a perspective sectional view of the upper cassette component as shown in FIG. 12.

This is in contrast to the bores 42 that are present in the upper cassette component 50, as shown in FIG. 12. The bores 42 are shown in greater detail in FIG. 13. Accordingly, the bores 42 in the upper cassette component 50 may provide an inlet for the potting material fed in from the respective channel to the inner cavity of the molded seal. The bore 42 only provides a relatively small inlet, which may be easily cleaned after production. For sealing, the bore 42 may be provided with a flat seal or gasket on the upper side, such that the respective channel is sealed all around or circumferentially, for example.

Figure 14:
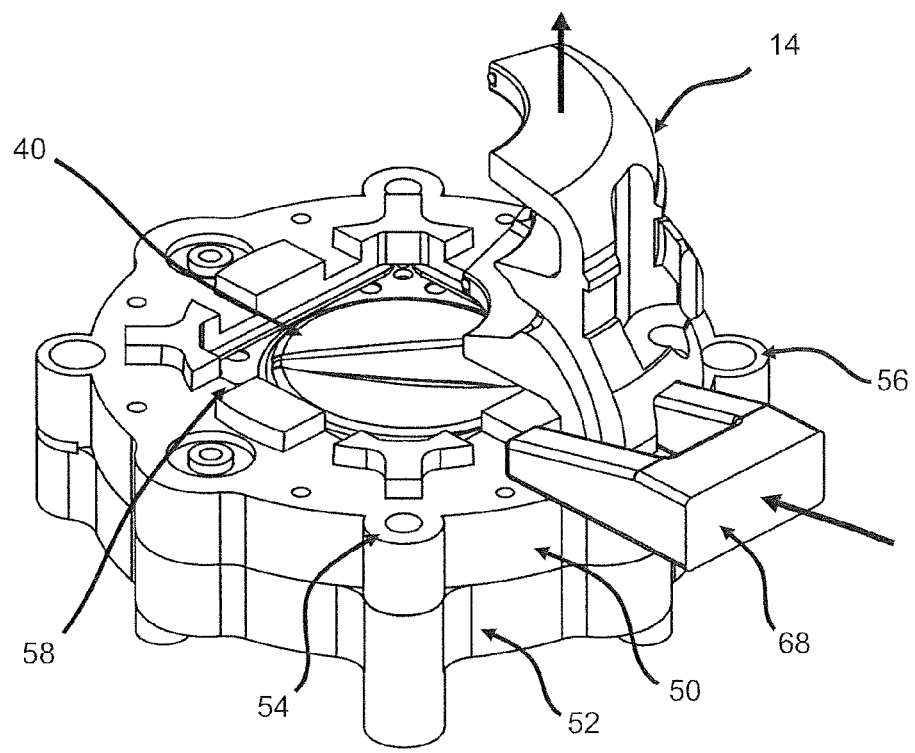
FIG. 14 is a perspective sectional view of the cassette according to FIG. 5 with one remaining distributor component.

The separation between the cassette and the respective channel is preferably facilitated by a corresponding recess in the lower area of the respective distributor components 14. For example, the recess may be wedge-shaped so that a wedge-shaped separating device 68 may be inserted into the recess and cause a separating movement as indicated by the arrows in FIG. 14. For example, the separating device 68 may be formed as a fork, wherein the fork engages in two adjacent recesses of two distributor components. In this way, the distributor or distributor components 14 may subsequently be removed from the cassette or the upper cassette component 50 and subsequently be cleaned.

Figure 15:
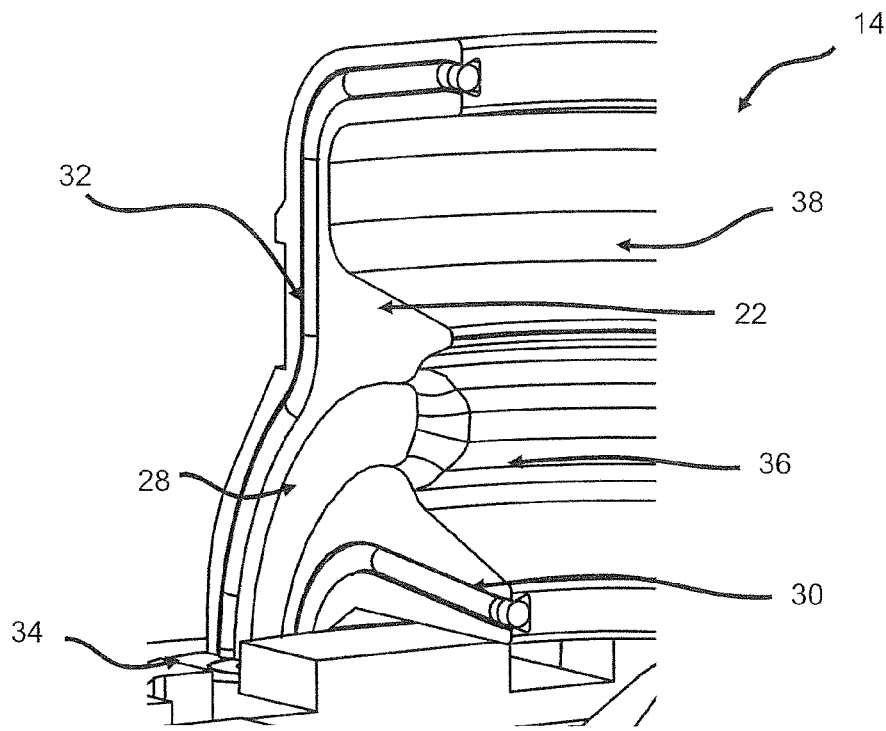
FIG. 15 is a detailed view of a seal or gasket at an interface or boundary surface of a distributor component.
Figure 16:
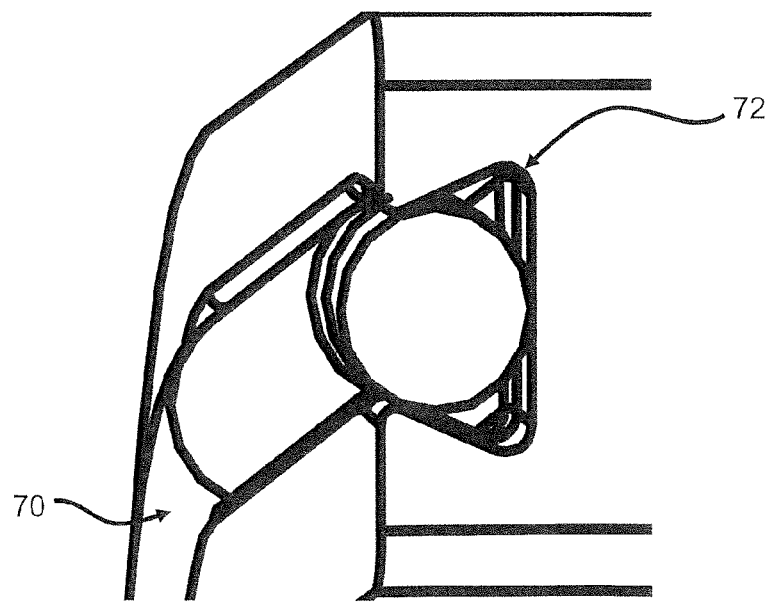
FIG. 16 is another detailed view of the seal according to FIG. 15.
Figure 17:
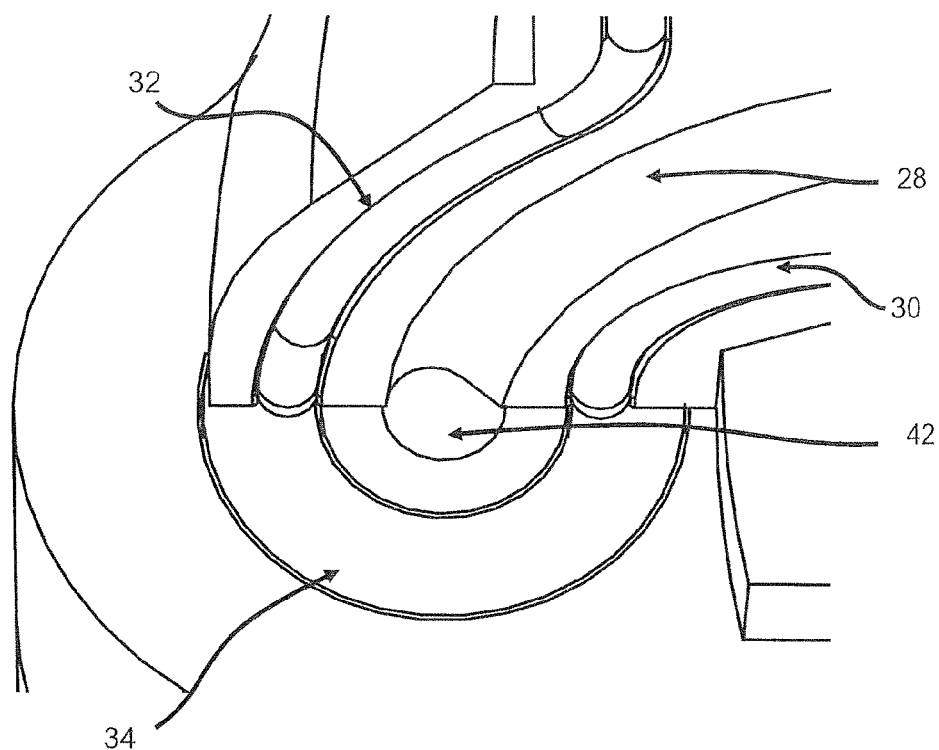
FIG. 17 is a detailed view of a sealing of the channel on a cassette surface.

FIGS. 15 to 17 show the advantageous seals of the casting device in detail. Accordingly, FIG. 15 shows a detailed view of a boundary surface or an interface 22 of a distributor component 14, wherein channel 28 is surrounded by an inner seal 30 and an outer seal 32 and may thus be fluidly sealed towards the surroundings. The outer seal 32 extends from an upper portion of the opening and overflow 38 to the lower end and downstream end of channel 28, respectively, such that the outer seal cord surrounds any components of the distributor containing potting material. Furthermore, the inner seal 30 seals the channel 28 to the cassette and to the lower section of the filling region 36. Where the respective channel 28 flows into a bore in the cassette, channel 28 can be surrounded by a flat gasket 34. The potting material may then be safely transported from the filling region 36 into the bore or the inner cavity of the molded seal without leakage.

As shown in FIG. 16, the inner and outer seals 30, 32 are furthermore attached to the interfaces or boundary surfaces 22 by means of a sealing groove 72, wherein a corresponding sealing cord 70 is inserted in the sealing groove 72. The sealing cord 70 consists of an elastic material, such that the sealing cord 70 may be inserted into the sealing groove 72 by means of a press fit. The adjacent boundary surface or interface 22 of the coupled distributor component may be formed without a sealing groove 72 and have a smooth surface such that the sealing cord 70 is pressed against the surface during assembly of the distributor or by clamping the distributor components and a fluid-tight seal is achieved.

A fluid-tight seal to the cassette may also be provided by a flat gasket 34 inserted at the top edge or rim of a bore 42 and surrounding the respective channel 28 as shown in FIG. 17. The gasket 34 may overlap with the inner seal 30 and the outer seal 32, which not only improves sealing, but also makes it easier to separate the distributor components. In addition, the distributor components may be dimensioned smaller in order to provide a compact configuration and reduce manufacturing costs.

Where applicable, all the individual features depicted in the exemplary embodiments may be combined and/or exchanged without leaving the scope of the invention.

LIST OF REFERENCE NUMERALS

10 Casting device
12 Distributor
14 Distributor component
16 Cassette
18 Clamping ring
20 Fixing screw
22 Boundary surface or interface
24 Recess
26 Opening
28 Channel
30 Inner seal
32 Outer seal
34 Flat seal or gasket
36 Funnel-shaped filling region
38 Overflow
40 Gas exchanger element or closure, respectively
42 Bore
44 Molded seal
45 Molded seal component
46 Inner cavity
48 Centrifuge attachment
50 Upper cassette component
52 Lower cassette component
54 Centering device
56 Fixing device
58 Opening
60 Sealing lip or sprue point
62 Opening
64 Centering sleeve
66 Opening
68 Wedge-shaped separating device
70 Sealing cord
72 Sealing groove

The invention claimed is:
1. A method of producing a potting for a gas exchanger under influence of a centrifugal force, the method comprising:
  inserting gas exchanger elements into an inner cavity of a cassette;

mounting on the cassette a distributor having an opening and at least one continuous channel such that the opening of the distributor is fluidly connected via the at least one channel to the cavity to form a casting device for producing the potting for the gas exchanger, wherein the distributor defines an overflow region which is arranged and shaped such that excess material in the inner cavity flows into the overflow region in an assembled state of the distributor; and feeding a potting material into the opening under influence of a centrifugal force, wherein mounting the distributor on the cassette comprises assembling distributor components to define the opening of the distributor, to define the overflow region, and to form the at least one channel between adjacent regions of the distributor components.

2. The method according to claim 1, wherein assembling the distributor components comprises attaching an inner seal and an outer seal on opposite sides of the at least one channel of each distributor component to fluidly seal the at least one channel in the assembled state of the distributor.

3. The method according to claim 1, comprising:

providing a molded seal which is formed from two couplable molded seal components, wherein the cassette is closable and formed to receive the molded seal, and wherein the cassette is formed of an upper couplable cassette component and a lower couplable cassette component in a direction of a centrifugal axis of the casting device;

inserting a first molded seal component of the two molded seal components into the lower cassette component and placing the gas exchanger elements on the first molded seal component;

placing a second molded seal component of the two molded seal components on the first molded seal component; and placing the upper cassette component on the second molded seal component so that the molded seal completely encloses the inner cavity and fluidly seals the inner cavity up to the at least one channel.

4. The method according to claim 1, wherein the distributor comprises at least two continuous channels.

5. The method according to claim 1, wherein the distributor components are uniformly shaped.

6. The method according to claim 5, wherein assembling the distributor components comprises assembling each distributor component adjacent to two distributor components and forming the at least one channel with the adjacent distributor components.

7. The method according to claim 6, wherein the distributor components comprise three or four uniformly shaped distributor components.

8. The method according to claim 1, wherein assembling the distributor components comprises assembling three or four uniformly shaped distributor components, wherein each distributor component, in the assembled state of the distributor, forms the at least one channel with the adjacent distributor components.

9. The method according to claim 1, further comprising connecting the distributor components in a detachable manner.

10. The method according to claim 1, wherein the opening comprises a funnel-shaped filling region for the potting material.

11. The method according to claim 1, wherein the overflow region includes a larger radial distance from a center of the cassette than an inner tolerance range of the potting to be produced.

12. The method according to claim 1, wherein the opening extends to an outer surface of the cassette and fluidly connects the cassette to an environment, and wherein the opening is concentric with a centrifugal axis of the casting device.

13. The method according to claim 1, wherein at least the distributor is reusable.

14. The method according to claim 1, further comprising providing the opening and the at least one channel with a non-stick coating.

15. The method according to claim 13, further comprising forming the distributor components of a material comprising aluminum.

* * * * *